Patented Dec. 6, 1927.

1,651,756

UNITED STATES PATENT OFFICE.

HEINRICH EHMSEN, OF MUNICH, GERMANY, ASSIGNOR TO JULIUS STERN, OF GELSENKIRCHEN, GERMANY.

MEANS FOR AUGMENTING ADHESION BETWEEN FRICTIONALLY-ENGAGING SURFACES.

No Drawing. Application filed May 25, 1923, Serial No. 641,505, and in Germany November 21, 1922.

My invention relates to means for increasing the friction and adhesion between the surfaces of frictional power transmission devices, and more specifically, to means which reduce slippage by building up charges of static electricity in the engaging surfaces.

Slippage of a belt on a pulley or between similar frictional engaging surfaces entails a loss of energy and a wearing of the surfaces. Means have been provided for reducing this slippage by the interposition of adhesive substances, but such substances remain effective for only a limited time and must therefore be frequently renewed. Slippage can of course be reduced by increasing the tension of a belt on its pulley, but this results in an increased friction at the pulley bearings and a greater strain upon the belt. Means for increasing friction have also been provided wherein the pulley has a rough surface, but this results in great mechanical wear of the belt.

The present invention attains an increase of frictional engagement by means entailing none of these disadvantages. This result is accomplished by increasing the electrostatic attraction between the surfaces resulting from the friction of the surfaces upon one another. For this purpose an insulating material is applied as a smooth coating to one of the surfaces and in the case of a belt and pulley device, preferably to the pulley. The friction between the belt and the pulley surface, due to a slight slippage which always exists under load and which is caused by the flexibility of the leather, will oppositely electrify the two surfaces. This will cause the surfaces to be attracted to each other, and thus the slippage will be reduced without increasing the tension upon the belt. The absolutely smooth surface of the coating causes an intimate contact between the surfaces and aids in this way to increase the attraction between them; at the same time, the mechanical wear of the belt is reduced to a minimum.

The insulating material may consist of an inorganic or organic substance, or of a mixture of the two. For example, a compound consisting of 52 parts of manganese dioxide, 25 parts of zinc white, and 5 parts of borax has achieved very satisfactory results. In the process of compounding the material, it is imperative that it contain adhesive binding constituents, hardening and smoothing substances and constituents for purposes of neutralization and quick drying.

Such a material applied to a pulley as a coating renders the surface of the pulley absolutely smooth; and in addition to having properties of hardness and toughness, it is very plastic and is adaptable for use with any type of frictional gear or power transmission device.

What I claim is:

The combination with a pulley and a belt running thereover, of means for increasing mutual adhesion between the belt and pulley, said means comprising a smooth hard coating of insulating material on the pulley adapted to artificially generate and augment the opposite electrostatic charges generated on the pulley and belt surfaces by their mutual friction.

In testimony whereof I hereunto affix my signature.

HEINRICH EHMSEN.